United States Patent [19]

Billings et al.

[11] 3,748,280

[45] July 24, 1973

[54] NICKEL-CALCIUM ALUMINATE-BARIUM SALT CATALYST

[76] Inventors: William G. Billings; William T. Nelson, both of c/o Phillips Petroleum Company, Bartlesville, Okla. 74004

[22] Filed: Oct. 28, 1971

[21] Appl. No.: 193,575

Related U.S. Application Data

[63] Continuation of Ser. No. 38,522, May 18, 1970, abandoned, which is a continuation-in-part of Ser. No. 647,935, June 22, 1967, Pat. No. 3,522,024, which is a continuation-in-part of Ser. No. 553,299, May 27, 1966, abandoned.

[52] U.S. Cl..................................... 252/430, 48/214
[51] Int. Cl... C10g 11/02, C10g 11/04, C10g 11/28
[58] Field of Search.......................... 252/430, 431 C; 48/214

[56] References Cited
UNITED STATES PATENTS

| | | | |
|---|---|---|---|
| 3,201,214 | 8/1965 | Fox et al. | 48/214 UX |
| 3,334,055 | 8/1967 | Dowden et al. | 48/214 X |
| 3,423,194 | 1/1969 | Kearby | 48/214 |
| 3,506,418 | 4/1970 | Billings | 252/430 X |

Primary Examiner—Patrick P. Garvin
Attorney—J. Arthur Young et al.

[57] ABSTRACT

A physically durable catalyst composition having high and long-lived catalytic activity comprising calcium aluminate and nickel promoted with a barium salt of an organic acid is provided. The catalyst is preferably prepared by impregnating the calcium aluminate support with a nickel salt, reducing the nickel salt-impregnated calcium aluminate and then adding the barium salt, followed by drying prior to use. The catalyst has utility in the steam reforming of hydrocarbons to produce gaseous products rich in methane, fungible with natural gas.

8 Claims, No Drawings

NICKEL-CALCIUM ALUMINATE-BARIUM SALT CATALYST

BACKGROUND OF THE INVENTION

This is a continuation application of our copending application Ser. No. 38,522 filed May 18, 1970 now abandoned, which is a continuation-in-part application of our copending application having Ser. No. 647,935, filed June 22, 1967, now U.S. Pat. 3,522,024, which in turn in a continuation-in-part application of Ser. No. 553,299, filed May 27, 1966, now abandoned.

This invention relates to catalytic compositions having superior physical and mechanical properties comprising barium treated nickel-calcium aluminate catalysts. In accordance with a further aspect, this invention relates to a barium treated nickel-calcium aluminate catalyst having high and long-lived catalytic activity and superior physical and mechanical properties which physical and mechanical properties are retained over extended periods of operation as well as on exposure to high temperatures which can temporarily exist because of local overheating or hot spots or by occasional temporary runaway reactor temperatures. In accordance with a further aspect, this invention relates to the conversion of hydrocarbons to a gaseous product rich in methane, fungible with natural gas, by contacting with a barium-promoted nickel-calcium aluminate catalyst in the presence of steam.

Accordingly, the present invention relates to a novel and highly superior catalyst comprising barium-treated nickel-calcium aluminate, which catalyst has utility for the production of methane-containing gases, fungible with natural gas, from hydrocarbon feedstocks.

An object of this invention is to provide a new and improved catalyst having outstanding physical durability.

Another object of this invention is to provide a new and improved catalyst having increased catalyst life as well as superior physical and mechanical properties.

Another object of this invention is to provide a new and improved catalyst having increased catalyst activity useful for the steam reforming of hydrocarbons to produce methane-rich gaseous products.

Other aspects and objects, as well as the several advantages of this invention, will be apparent to one skilled in the art from a study of this disclosure and the appended claims.

SUMMARY OF THE INVENTION

According to the invention, a novel and improved catalyst comprising nickel and a calcium aluminate support promoted with barium salt of an organic acid is provided. It has been found that barium-treated nickel-calcium aluminate catalysts exhibit not only high and long-lived catalytic activity. but also superior physical and mechanical properties which are retained over extended operation as well as on exposure to high temperatures.

The catalyst of the invention has utility in the production of methane-containing gases, fungible with natural gas, from hydrocarbon feedstocks as disclosed in our said applications.

DESCRIPTION OF THE PREFERRED EMBODIMENTS

The catalyst of the invention preferably consists essentially of calcium aluminate containing from 5 to 90 weight percent nickel on a reduced basis and 1 to 10 weight percent of a barium salt of an organic acid. In a presently preferred embodiment of the catalyst composition of the invention, the amount of nickel present ranges from 20–50 weight percent and the amount of the barium salt of the organic acid ranges from 2–8 weight percent.

The nickel content of the catalyst is calculated as percent elemental nickel based on the nickel-calcium aluminate portion of the catalyst. The barium salt is calculated as percent barium acetate and is also based upon the nickel-calcium aluminate portion of the catalyst. During activation and/or operation, the barium salt is likely changed to another form such as barium oxide or barium carbonate. Hence, the barium salt is calculated in this manner simply as a convenience.

The calcium aluminate component of the catalyst can be represented by the chemical formula $CaO \cdot Al_2O_3$. The nickel catalyst of the invention exhibits a considerably longer catalyst life than is obtained with other prior art promoted nickel catalysts. The nickel catalyst of the invention also exhibits outstanding physical durability not found with other prior art promoted nickel catalysts.

The catalyst can be prepared by any of the procedures known to the industry, such as by impregnation of the support with aqueous or nonaqueous solutions of the active ingredients, coprecipitation of the active and support ingredients, physical mixing, and the like. The barium promoter can be added before, during, or after the addition of the nickel to the support, and can be added in the form of any salt of an organic acid or hydroxy-substituted organic acid that is soluble in water or an organic solvent. Any suitable nickel salt, such as nickel acetate, nickel nitrate, and the like, can be used. Examples of barium salts that can be used are the formate, acetate, propionate, butyrate, caproate, malate, gluconate, benzoate, salicylate, mandelate, cinnamate, and the like. A presently preferred method for preparing the catalyst of the invention is to precipitate a basic nickel carbonate in the presence of the support, filter, dry, impregnate with a solution of a barium salt of an organic acid, and dry. For use in fixed-bed operation, the catalyst can be granulated or pelleted at any suitable point during the preparation, such as after the formation of the nickel-support mixture or after the formation of barium-nickel-support mixture. For use in fluidized-bed operation such granulation or pelleting is unnecessary. As indicated above, the nickel component of the catalyst can be reduced and stabilized to prevent reaction with the oxygen in the air at any point subsequent to the addition of the nickel. Such reduction and stabilization permits loading the catalyst into the reactor and using it without a reduction step. However, it is within the scope of the invention to reduce the catalyst with hydrogen or a hydrogen-containing gas after it is in the reactor.

The use of alkali or alkaline earth promoters in nickel-containing steam reforming catalysts is known. However, according to the invention, we have shown that the use of a particular alkaline earth in the form of a soluble salt of an organic acid results in the production of a catalyst that is more active than a similar catalyst using the promoter most used in catalysts of commerce, i.e., potassium carbonate.

A presently preferred method of preparing the catalyst of the invention is to impregnate the calcium aluminate with a nickel salt, followed by reduction by contacting with a hydrogen-containing gas to form a nickel-calcium aluminate composition. The reduction is carried out in any suitable manner such as by heating the composite at temperatures above about 700° F for a period of time sufficient to substantially reduce the nickel compound to the metallic state. This composition is then impregnated with a barium salt of an organic acid, followed by drying prior to use.

As indicated hereinbefore, the catalyst of the invention has utility in the reforming of hydrocarbons to methane-rich products. As set forth in our earlier applications, the hydrocarbon feedstocks processible to methane-rich products comprise hydrocarbons having from two to about 15 carbon atoms per molecule. Such feedstocks preferably contain predominantly paraffinic hydrocarbon such as propane, butane, hexane, octane, decane, dodecane, pentadecane, and the like. The hydrocarbon feedstock can contain minor amounts of unsaturated materials when desired. The higher molecular weight hydrocarbons in the feedstock will ordinarily have a maximum boiling point of about 500° F.

The reforming temperature employed can vary appreciably, but preferably will be in the range 600°–1,000° F for best results in obtaining gaseous products rich in methane. The reaction pressure will ordinarily be 100–500 psig, but higher pressure can be used to advantage to give a product gas containing more methane and carbon dioxide and less hydrogen and carbon monoxide. The steam to hydrocarbon weight ratio is ordinarily at least 1.2 to 1, generally in the range 1.2–6 to 1. The total gaseous hourly space velocity (GHSV) ordinarily ranges from 500–40,000 volumes of gas per volume of catalyst per hour, calculated at 32° F and 1 atmosphere.

EXAMPLE I

A propane reforming test was made at 300 psig with a catalyst prepared by impregnating a pre-reduced, stabilized nickel-calcium aluminate catalyst (Girdler G–65RS) with an aqueous solution of barium acetate to give 5 weight percent barium acetate and drying:

| | |
|---|---|
| Time in Run, hr. | 155 |
| Temperature, °F | |
| Inlet | 715 |
| Outlet | 799 |
| GHSV of $C_3H_8 + H_2O$ | 3250 |
| Steam/$C_3H_8$, wt. | 1.56 |
| $C_3H_8$ Conv., wt. % | 99.7 |
| Dry Gas Composition, mol % | |
| $H_2$ | 8.1 |
| $CH_4$ | 75.1 |
| $C_2H_6$ | 0.0 |
| $C_3H_8$ | 0.1 |
| $CO_2$ | 16.7 |

It was not necessary to reduce the impregnated catalyst prior to use. The catalyst was active when put on stream. The catalyst contained 21.4 weight percent nickel.

Use of the pre-reduced, stabilized nickel catalyst for the preparation of the finished catalyst is highly desirable, because it is only necessary to impregnate with the barium salt solution, dry, and start reforming. There is no reduction period required, and there is no induction period of low activity during reforming. The pre-reduced catalysts are prepared by reduction with hydrogen followed by just enough surface-treating with an oxygen-containing gas to form enough nickel oxide on the surface to prevent spontaneous oxidation during shipping. Most of the nickel is in reduced form.

EXAMPLE II

A number of long duration durability tests, using two different catalysts, were carried out for the steam reforming of propane to a methane-containing product. In one series of runs a barium-treated nickel-calcium aluminate catalyst was employed and in another series a barium-treated nickel-alumina catalyst was employed.

The barium-treated nickel-calcium aluminate catalyst was a catalyst similar to that of Example I and was prepared by impregnating a nickel-calcium aluminate catalyst (Girdler G–65RS, containing 21.4 weight percent nickel) with sufficient aqueous barium acetate to contain, after drying, 5 weight percent barium acetate.

The barium-treated nickel-alumina catalyst was prepared by impregnating a nickel-alumina catalyst (Girdler G–12, containing 38 weight percent nickel) with sufficient aqueous solution of barium acetate to contain, after drying, 5 weight percent barium acetate.

The conditions for the steam reforming run and the product analysis for each of the runs are set forth in the following table:

TABLE I.—STEAM REFORMING OF PROPANE

| | Nickel-alumina treated to contain 5% barium acetate ⅛ × ⅛-inch tablets | | | Nickel-calcium aluminate treated to contain 5% barium acetate ⅛ × ⅛-inch tablets | | |
|---|---|---|---|---|---|---|
| Run number | 1 | 2 | 3 | 4 | 5 | 6 |
| Time in run, hr | 50 | 240–360 | 810 | 370 | 2,080 | **2,400 |
| Temperature, °F.: | | | | | | |
| Inlet | 680 | 670 | 680 | 700 | 700 | 700 |
| Outlet | 770 | 770 | 770 | 790 | 800 | 800 |
| Reaction pressure, p.s.i.g.: | | | | | | |
| Inlet | 300 | 300 | *380 | 300 | 300 | 300 |
| Outlet | 300 | 300 | 300 | 300 | 300 | 300 |
| Steam/propane ratio: | | | | | | |
| Weight | 1.67 | 1.67 | 1.57 | 1.74 | 1.70 | 1.70 |
| Mole | 4.1 | 4.1 | 3.8 | 4.25 | 4.2 | 4.2 |
| GHSV (total) | 3,600 | 3,600 | 3,600 | 3,450 | 3,500 | 3,500 |
| Comp. of dry gas, mole percent: | | | | | | |
| Hydrogen | 7.2 | 7.1 | 7.1 | 5.2 | 5.8 | 6.2 |
| Methane | 75.0 | 75.3 | 75.8 | 77.4 | 76.9 | 75.5 |
| Propane | 0.2 | 0.2 | 0.0 | 0.0 | 0.0 | 0.2 |
| Carbon dioxide | 17.6 | 17.4 | 17.1 | 17.4 | 17.3 | 18.1 |
| Propane conversion, percent | 99 | 99 | 100 | 100 | 100 | 99.3 |

*Terminated at this time because of excessive pressure drop across the reactor due to catalyst disintegration.
**Terminated merely for examination of catalyst. No fines or broken pellets were found in the reactor. No significant carbon was present. The pill strength of this used catalyst was found to be 27 lbs. The pill strength of the fresh catalyst, before use, was 24 lbs.

It can be seen from the above tabulation that all of the runs were carried out under comparable conditions and that the catalyst composition of barium-treated calcium aluminate-nickel was considerably better than the barium-treated nickel-alumina composition. It will be observed from the above tabulation that the alumina-containing catalyst operated but for only 810 hours at which time it was removed from service because of excessive pressure drop across the reactor.

The catalyst composition of the invention, the barium-treated calcium aluminate-nickel catalyst, was still operating extremely well at the end of 2,400 hours service at which time it was removed from service merely for examination. No fines or broken pellets were found in the reactor containing the nickel-calcium aluminate barium-treated catalyst whereas the nickel-alumina catalyst runs were terminated because of excessive pressure drop across the reactor due to catalyst disintegration.

The superiority of the barium-treated nickel-calcium aluminate catalyst was due not only to its high and long-lived catalytic activity, but also to its superior physical and mechanical properties which are retained over extended operation as well as on exposure to high temperature.

Reasonable variation and modification are possible within the scope of the foregoing disclosure and the appended claims to the invention, the essence of which is that there is provided a physically durable catalyst having high and long-lived catalytic activity comprising nickel supported on calcium aluminate promoted with a barium salt of an organic acid, which catalyst has utility for the production of methane-containing gases, fungible with natural gas, from hydrocarbon feedstocks.

That which is claimed is:

1. A physically durable catalyst composition having high and long-lived catalytic activity consisting essentially of calcium aluminate containing from 5–90 weight percent nickel on a reduced basis and promoted with 1–10 weight percent of a barium salt of a carboxylic acid.

2. A catalyst according to claim 1 containing from 20–50 weight percent nickel and promoted with from 2–8 weight percent of the barium salt of a carboxylic acid.

3. A catalyst according to claim 1 wherein said barium salt is barium acetate.

4. A catalyst as defined in claim 1 formed by reducing a nickel salt and calcium aluminate by contacting same with a hydrogen-containing gas prior to incorporation of the barium salt.

5. A catalyst as defined in claim 4 formed by impregnating calcium aluminate with a nickel salt, reducing the calcium aluminate impregnated with the nickel salt by contacting same with a hydrogen-containing gas under conditions to form nickel supported on calcium aluminate which reduced composition is impregnated with a barium salt and then dried prior to use.

6. A catalyst as defined in claim 5 wherein the barium salt is barium acetate.

7. A catalyst as defined in claim 5 wherein the conditions include a temperature above about 700° F.

8. A catalyst as defined in claim 1 wherein the catalyst contains about 20 weight percent nickel and about 5 weight percent barium acetate.

* * * * *